(12) United States Patent
Grcanac et al.

(10) Patent No.: US 8,595,595 B1
(45) Date of Patent: Nov. 26, 2013

(54) IDENTIFYING LOST WRITE ERRORS IN A RAID ARRAY

(75) Inventors: Tomislav Grcanac, San Jose, CA (US); Atul Goel, San Jose, CA (US); Jagadish Vasudeva, Karnataka (IN); Gururaj MJ, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 282 days.

(21) Appl. No.: 12/979,130

(22) Filed: Dec. 27, 2010

(51) Int. Cl.
 *G11C 29/00* (2006.01)
(52) U.S. Cl.
 USPC .......... 714/770; 714/6.2; 714/6.22; 714/6.24; 714/732; 714/800
(58) Field of Classification Search
 USPC ................ 714/6.2, 6.22, 6.24, 732, 770, 800
 See application file for complete search history.

(56) References Cited

U.S. PATENT DOCUMENTS

| 7,549,089 | B1 * | 6/2009 | Kimmel et al. | 714/42 |
|---|---|---|---|---|
| 7,552,357 | B2 | 6/2009 | Grcanac et al. | |
| 7,873,878 | B2 * | 1/2011 | Belluomini et al. | 714/52 |
| 8,112,679 | B2 * | 2/2012 | Bean et al. | 714/54 |
| 8,327,250 | B1 * | 12/2012 | Goel | 714/801 |
| 2006/0075281 | A1 * | 4/2006 | Kimmel et al. | 714/5 |
| 2006/0248378 | A1 * | 11/2006 | Grcanac et al. | 714/6 |

* cited by examiner

*Primary Examiner* — Charles Ehne
(74) *Attorney, Agent, or Firm* — Blakely Sokoloff Taylor & Zafman LLP

(57) ABSTRACT

A storage server stores data in a stripe of a parity group that includes a plurality of data storage devices to store data and a parity storage device to store parity information. The stripe includes a data block from each of the data storage devices and a parity block from the parity storage device. The storage server receives a data access request specifying a data block in the stripe, and a lost write detection module detects an error in the data block. The lost write detection module compares a first storage device signature stored in a metadata field associated with the data block to a second storage device signature stored in a global field of the data storage device containing the data block. If the first storage device signature matches the second storage device signature, the lost write detection module compares a consistency point count stored in the metadata field to a reconstructed consistency point count. If the reconstructed consistency point count is greater than the consistency point count stored in the metadata field, the lost write detection module identifies the error as a lost write error for the data block. Accurately detecting and identifying the location of a lost write allows the storage server to correct the error and provide a user with a complete and accurate set of data.

23 Claims, 7 Drawing Sheets

IDENTIFYING LOST WRITE ERRORS IN A RAID ARRAY

TECHNICAL FIELD

This invention relates to the field of data storage systems and, in particular, to identifying lost write errors in a RAID array.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system can include at least one storage server, which is a processing system configured to store and retrieve data on behalf of one or more storage client processing systems ("clients"). In the context of NAS, a storage server may be a file server, which is sometimes called a "filer." A filer operates on behalf of one or more clients to store and manage shared files in a set of mass storage devices, such as magnetic or optical disks or tapes. The mass storage devices may be organized into one or more volumes or aggregates of a Redundant Array of Inexpensive Disks (RAID). Filers are made by NetApp, Inc. of Sunnyvale, Calif. (NetApp®).

In a SAN context, the storage server provides clients with block-level access to stored data, rather than file-level access. Some storage servers are capable of providing clients with both file-level access and block-level access, such as certain Filers made by NetApp.

In a large scale storage system, it is possible that data may become corrupted or stored incorrectly from time to time. Consequently, virtually all modern storage servers implement various techniques for detecting and correcting errors in data. RAID schemes, for example, include built-in techniques to detect and, in some cases, to correct corrupted data. Error detection and correction is often performed by using a combination of checksums and parity. Error correction can also be performed at a lower level, such as at the disk level.

In file servers and other storage systems, occasionally a write operation executed by the server may fail to be committed to the physical storage media, without any error being detected. The write is, therefore, "lost." This type of the error is typically caused by faulty hardware in a disk drive or in a disk drive adapter dropping the write silently without reporting any error. It is desirable for a storage server to be able to detect and correct such "lost writes" any time data is read.

While modern storage servers employ various error detection and correction techniques, these approaches are inadequate for purposes of detecting a lost write error. For example, in at least one well-known class of file server, files sent to the file server for storage are first broken up into 4 kilobyte (Kb) blocks, which are then formed into groups that are stored in a "stripe" spread across multiple disks in a RAID array. File system context information, such as a file identifier, a file block number (FBN), and other information such as a checksum, a volume block number (VBN) which identifies the logical block number where the data are stored (since RAID aggregates multiple physical drives as one logical drive), a disk block number (DBN) which identifies the physical block number within the disk in which the block is stored are stored in block-appended metadata fields. In one known implementation, the context information is included in a 64-byte checksum area structure that is collocated with the block when the block is stored. This error detection technique is sometimes referred to as "block-appended checksum." Another type of checksum is referred to as "zone checksum." In zone checksum, a disk is divided into small zones and a special block within each zone is used to store the 64-byte checksum area structures for the remaining blocks in the same zone. Block-appended checksum and zone checksum can detect data corruption due to bit flips, partial writes, sector shifts and block shifts. However, it cannot detect corruption due to a lost block write, because all of the information included in the identity structure will appear to be valid even in the case of a lost write. Furthermore, this mechanism can detect data corruption only when the data blocks are accessed through the file system. When block reads are initiated by a RAID layer, such as to compute parity, to "scrub" (verify parity on) an aggregate, or to reconstruct a block (e.g., from a failed disk), the RAID layer does not have the context information of the blocks. Therefore, this mechanism does not help to detect lost writes on RAID generated reads.

SUMMARY OF THE INVENTION

A storage server stores data in a stripe of a parity group that includes a plurality of data storage devices to store data and a parity storage device to store parity information. The stripe includes a data block from each of the data storage devices and a parity block from the parity storage device. The storage server receives a data access request specifying a data block in the stripe, and a lost write detection module detects an error in the data block. The lost write detection module compares a first storage device signature stored in a metadata field associated with the data block to a second storage device signature stored in a global field of the data storage device containing the data block. If the first storage device signature matches the second storage device signature, the lost write detection module compares a consistency point count stored in the metadata field to a reconstructed consistency point count. If the reconstructed consistency point count is greater than the consistency point count stored in the metadata field, the lost write detection module identifies the error as a lost write error for the data block. Accurately detecting and identifying the location of a lost write allows the storage server to correct the error and provide a user with a complete and accurate set of data.

BRIEF DESCRIPTION OF THE DRAWINGS

The present invention is illustrated by way of example, and not by way of limitation, in the figures of the accompanying drawings.

DETAILED DESCRIPTION

Figure 1A:
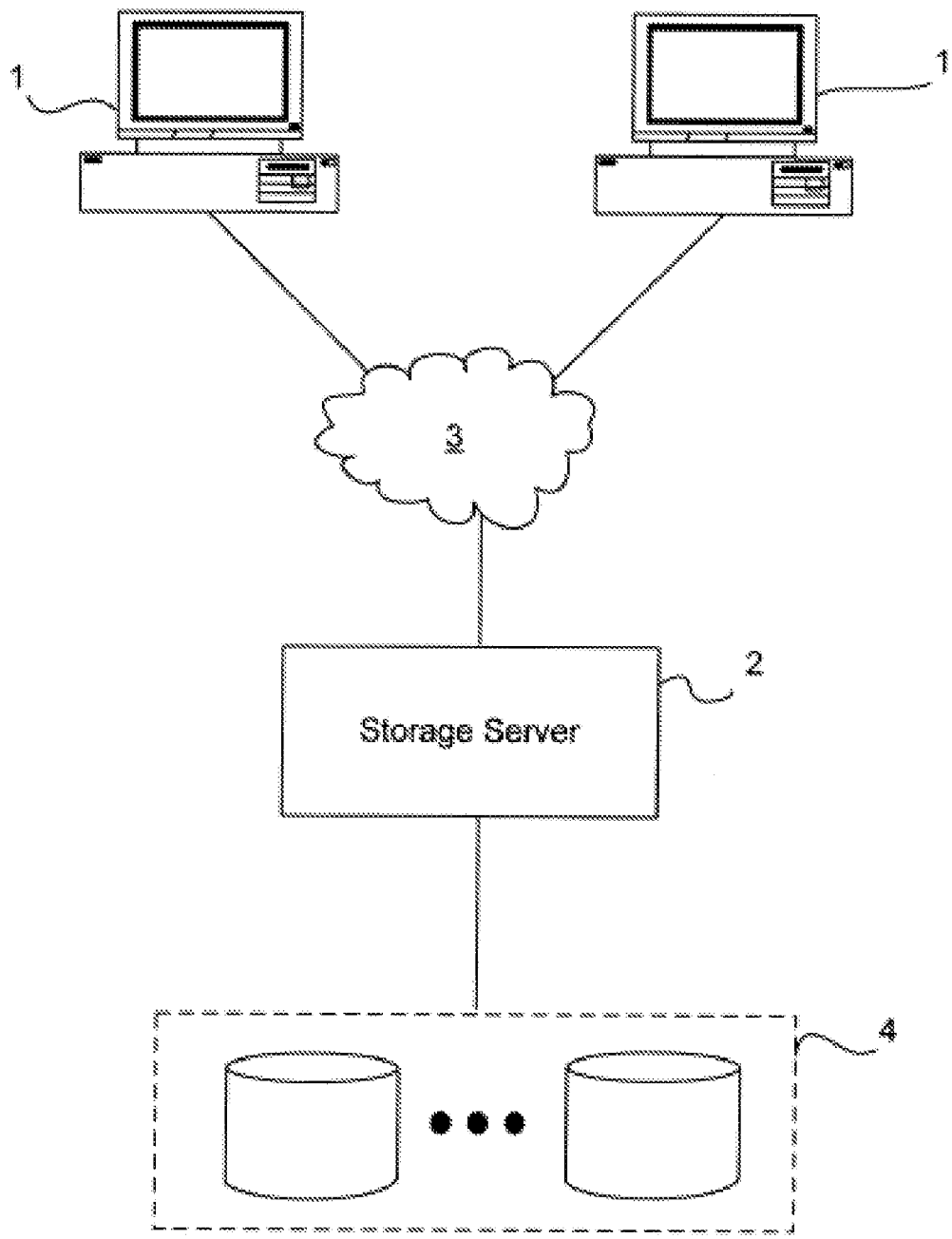
FIG. 1A is a block diagram illustrating a network storage system in which lost write detection may be implemented according to an embodiment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Single parity schemes such as RAID-3, RAID-4 or RAID-5 can determine whether there is a corrupted block in a stripe due to a lost write. Error detection compares the stored and computed values of parity, and if they do not match, the data may be corrupt. However, in the case of single parity schemes, while a single bad block can be reconstructed from the parity and remaining data blocks, there is not enough information to determine which disk contains the corrupted block in the stripe. Consequently, the corrupted data block cannot be recovered using parity.

Another mechanism detects lost writes during RAID generated reads. The mechanism stores a generation identifier (ID), including a generation count and a supplemental ID (which may be a random number), on disk data blocks during writes and maintains a copy of the generation ID of all the data blocks in a stripe in a bitmap stored in the parity block of the stripe. The generation ID is used by a RAID layer in the storage server to uniquely identify a particular write to the data block. The generation ID is also used to detect a stale data block (i.e., when a particular write operation was not committed to the physical storage media of the data block). The generation count indicates the number of times the data block has been written. It is therefore possible, when reading a data block, to detect a lost write by reading the corresponding parity block and verifying the generation ID stored in both the blocks. With this mechanism, corrupted blocks due to lost writes can be detected on all reads and can recover the lost data from the parity and remaining data blocks. However, this mechanism relies on certain metadata sanity check parameters stored in the checksum area of a block to confirm the lost-write. The metadata sanity check parameters can be trusted only if the metadata belongs to the aggregate (specifically the RAID group or parity group) in question (meaning the generation IDs would match). In one embodiment, during reconstruction of a non-zeroed disk, only limited space is available on the parity disk to store the supplemental ID. For example, the supplemental ID may be stored as a 32 bit number on each data disk, while only 8 bits are available on the parity disk. Additionally, in some circumstances, such as small degraded RAID groups, only 8 bits are available for the supplemental ID on the data disks as well. In such cases, where only 8 bits are available on either the data disks or the parity disks, the probability of an accidental match for the supplemental IDs is relatively high (i.e., 1 in 255). If the parameters used for the sanity check do not belong to the associated aggregate, the data may be stale. Comparing such stale data to confirm the lost write on a suspected block may result in inadvertently corrupting good data.

Another key metadata sanity check parameter used to confirm a lost write on a suspected block is CP count, also called "consistency point." Consistency point is the recurring event at which writes that have been buffered in memory of the storage server are committed to mass storage. For a given data block, the CP count indicates the particular consistency point at which the data block was last written. The CP count is parity protected across the stripe, and thus may be reconstructed using parity techniques. If the reconstructed CP count is greater than the on-disk CP count, the reconstructed data is newer than the data present on the disk, and vice versa. This can be trusted as long as the CP count belongs to the associated aggregate. In one embodiment, where blocks are copied to a non-empty aggregate, the CP count from the old aggregate may be present together with a CP count from the newly copied aggregate. If the CP count used for the sanity check does not belong to the associated aggregate, the sanity check can lead to the incorrect determination of bad data and can result in inadvertently corrupting good data. Comparison between the CP counts from different aggregates may not yield the desired result of identifying which CP count is more recent.

The present invention uses storage device signatures to identify lost write errors in a RAID array. A storage device signature verifies that metadata associated with a particular data block belongs to the current aggregate and can be used for comparison. Matching such a signature verifies that the metadata used to confirm the lost write can be trusted. In one embodiment, the storage device signature provides a reliable way of identifying lost write errors in a RAID array by identifying whether data stored on a disk block belongs to the associated aggregate or not. As described further below, the storage device signature is assigned to a disk by a storage server when the disk becomes part of a RAID group or parity group through group creation, addition, sick disk copy, and/or reconstruction. This storage device signature may be persistently preserved in a label or other global construct or field stored on the disk.

For every write to a data block, the storage device signature stored in the label for the disk will be written to the checksum area or metadata field of the particular block. Thus, if a block contains the corresponding storage device signature from the disk label, the block has had at least one successful write after becoming part of the given aggregate. When a disk is removed from one RAID group or aggregate and becomes part of a different RAID group, it is assigned a different storage device signature which is saved in the disk label. The data blocks on that disk will have the old storage device signature in the checksum areas indicating those are the data blocks belonging to the old aggregate. When data is written to those disk blocks, the new storage device signature is written to the checksum area. So, for a given block on a disk, the storage device signature indicates whether or not it is hosting the current aggregate data. Additionally, in another embodiment, the storage device signature may provide an indication whether data stored on a disk drive is invalid. The invalid data may be written prior to the disk drive being added to an array of the disk drives or may be data in a block that has become free and which has been removed from the corresponding parity block of the stripe. Knowing that the disk drive was written prior to the drive being added to the existing array or having data which has become invalid allows a storage server to ignore the invalid data and not to use it when computing parity (i.e., a data protection value computed as a result of a logical operation on data blocks in a stripe in the array of disk drives). This, in turn, eliminates the need to zero disk drives or to perform parity re-computation prior to using the disk drives.

A disk block signature may be treated as valid when it matches the signature stored in the disk label. Similarly, a disk block signature may be treated as invalid when it does not match the signature stored in the disk label. If a disk block has a valid storage device signature, the block was written successfully at least once after becoming part of the current aggregate, and the data available in that block belongs to the current aggregate. If a disk block does not have a valid storage device signature, the block may not have been written successfully at least once after becoming part of the current aggregate and hence the block contents, particularly the sanity check parameters stored in the disk block metadata regions, cannot be trusted entirely. With the storage device signature mechanism described in this embodiment, after detecting a suspected error, such as a generation count mismatch, a lost write detection module will verify the storage device signature and determine whether or not the metadata regions can be trusted entirely. If the storage device signature in the metadata region of the data block matches the storage device signature in the disk label, a CP count is reconstructed, as described below, and compared to the on-disk CP count in the metadata. If the reconstructed CP count is greater than the on-disk CP count, a lost write detection module identifies the lost write on the current disk. If the reconstructed CP count is less than the on-disk CP count, the lost write detection module identifies the lost write on a parity disk. If the storage device signature in the metadata region of the data block does not match the storage device signature, the lost write detection module may identify the lost write on the current disk.

FIG. 1A shows an example of a network environment which incorporates a storage system 2, which provide clients with file-level access, block-level access, or a combination of file-based and block-based storage access. The storage system 2 in FIG. 1A is coupled locally to a storage subsystem 4 which includes a set of mass storage devices, and to a set of storage clients 1 (hereinafter simply "clients") through a network 3, which may be a local area network (LAN), a wide area network (WAN), a global area network (GAN) such as the Internet, or a combination of such networks. Each of the clients 1 may be, for example, a conventional personal computer (PC), workstation, or the like. The storage subsystem 4 is managed by the storage system 2. The storage system 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

Figure 1B:
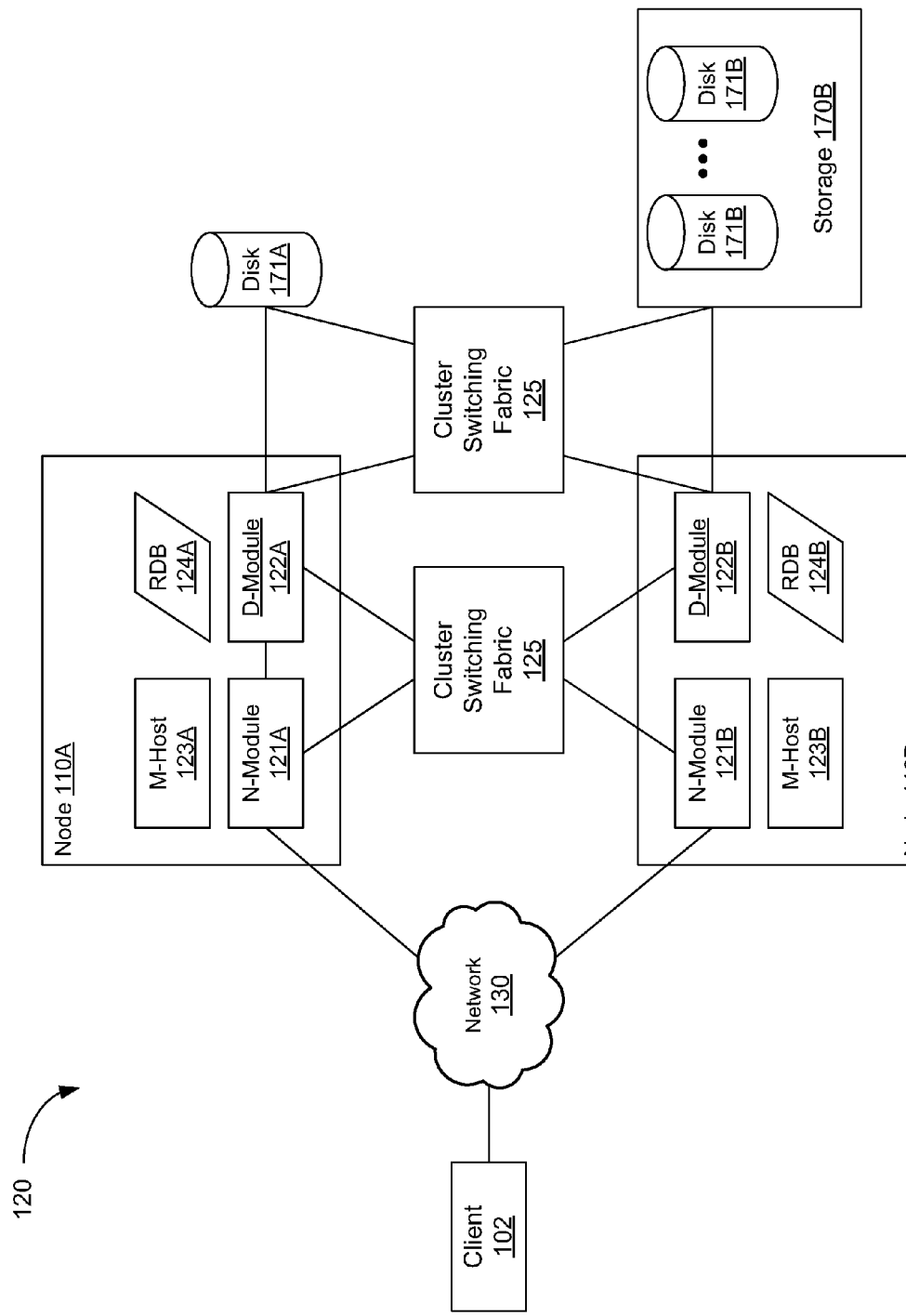
FIG. 1B is a block diagram illustrating a distributed or clustered architecture for a network storage system in which lost write detection may be implemented according to an embodiment.

The storage system 2 may have a distributed architecture; for example, it may include a separate N—("network") blade and D—(disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage system 2 may have an integrated architecture, where the network and data components are all contained in a single box. The storage system 2 further may be coupled through a switching fabric to other similar storage systems (not shown) which have their own local storage subsystems. In this way, all of the storage subsystems can form a single storage pool, to which any client of any of the storage systems has access. FIG. 1B illustrates block diagram of a distributed or clustered network storage system 120 which may implement lost write detection in one embodiment. System 120 may include storage servers implemented as nodes 110 (nodes 110A, 110B), which are each configured to provide access to storage devices 171. In FIG. 1B, nodes 110 are interconnected by a cluster switching fabric 125, which may be embodied as an Ethernet switch.

Nodes 110 may be operative as multiple functional components that cooperate to provide a distributed architecture of system 120. To that end, each node 110 may be organized as a network element or module (N-module 121A, 121B), a disk element or module (D-module 122A, 122B), and a management element or module (M-host 123A, 123B). In one embodiment, each module includes a processor and memory for carrying out respective module operations. For example, N-module 121 may include functionality that enables node 110 to connect to client 102 via network 130 and may include protocol components such as a media access layer, Internet Protocol (IP) layer, Transport Control Protocol (TCP) layer, User Datagram Protocol (UDP) layer, and other protocols known in the art.

In contrast, D-module 122 may connect to one or more storage devices 171 via cluster switching fabric 125 and may be operative to service access requests on devices 171. In one embodiment, the D-module 122 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 1B, a storage abstraction layer (e.g., file system) of the D-module divides the physical storage of devices 171 into storage objects. Requests received by node 110 (e.g., via N-module 121) may thus include storage object identifiers to indicate a storage object on which to carry out the request.

Also operative in node 110 is M-host 123 which provides cluster services for node 110 by performing operations in support of a distributed storage system image, for instance, across system 120. M-host 123 provides cluster services by managing a data structure such as a replicated database (RDB) 124 (RDB 124A, 124B), which contains information used by N-module 121 to determine which D-module 122 "owns" (services) each storage object. The various instances of RDB 124 across respective nodes 110 may be updated regularly by M-host 123 using conventional protocols operative between each of the M-hosts (e.g., across network 130) to bring them into synchronization with each other. A client request received by N-module 121 may then be routed to the appropriate D-module 122 for servicing to provide a distributed storage system image.

It should be noted that while FIG. 1B shows an equal number of N-modules and D-modules constituting a node in the illustrative system, there may be different number of N-modules and D-modules constituting a node in accordance with various embodiments of lost write detection. For example, there may be a number of N-modules and D-modules of node 110A that does not reflect a one-to-one correspondence between the N-modules and D-modules of node 110B. As such, the description of a node comprising one N-module and one D-module for each node should be taken as illustrative only.

Figure 2:
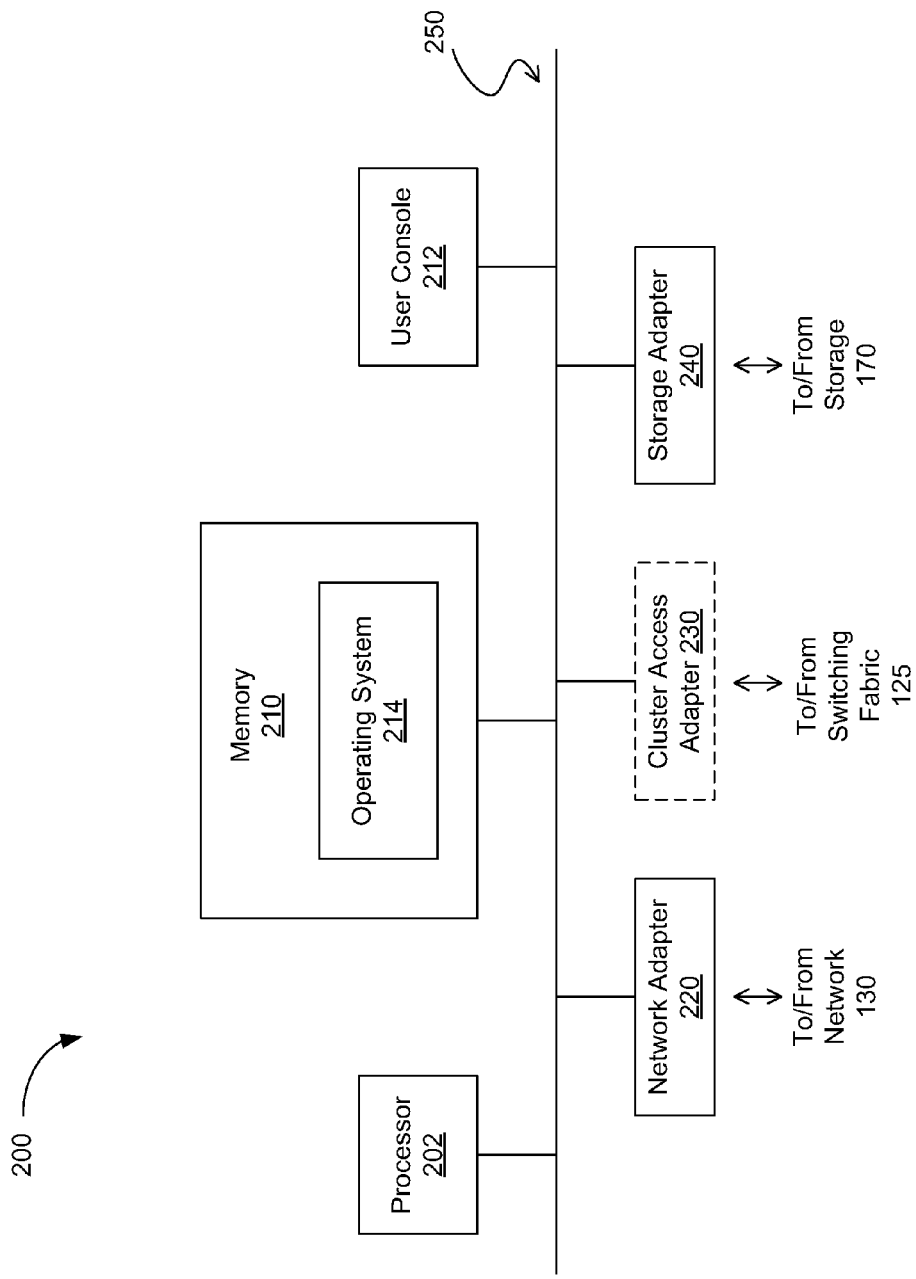
FIG. 2 is a block diagram illustrating a hardware architecture of a storage system in which lost write detection may be implemented according to an embodiment.

FIG. 2 is a block diagram of an embodiment of a storage server, such as storage server 2 of FIG. 1A, embodied as a general or special purpose computer including a processor 202, a memory 210, a user console 212, a network adapter 220, and a storage adapter 240 interconnected by a system bus 250, such as a convention Peripheral Component Interconnect (PCI) bus.

Memory 210 includes storage locations addressable by processor 202, network adapter 220 and storage adapter 240 for storing processor-executable instructions and data structures associated with the lost write detection. A storage operating system 214, portions of which are typically resident in memory 210 and executed by processor 202, functionally organizes the storage server by invoking operations in support of the storage services provided by the storage server. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 202 and executable software can be implemented by hardware, such as integrated circuits configured as programmable logic arrays, ASICs, and the like.

Network adapter 220 comprises one or more ports to couple the storage server to one or more clients over point-to-point links or a network. Thus, network adapter 220 includes the mechanical, electrical and signaling circuitry needed to couple the storage server to one or more clients over a network. Each client may communicate with the storage server over the network by exchanging discrete frames or packets of data according to pre-defined protocols, such as TCP/IP.

Storage adapter 240 includes a plurality of ports having input/output (I/O) interface circuitry to couple the storage devices (e.g., disks) to bus 221 over an I/O interconnect arrangement, such as a conventional high-performance FC or SAS link topology. Storage adapter 240 typically includes a device controller (not illustrated) comprising a processor and a memory for controlling the overall operation of the storage units in accordance with read and write commands received from storage operating system 214. As used herein, data written by a device controller in response to a write command is referred to as "write data," whereas data read by device controller responsive to a read command is referred to as "read data."

User console 212 enables an administrator to interface with the storage server to invoke operations and provide inputs to the storage server using a command line interface (CLI) or a graphical user interface (GUI). In one embodiment, user console 212 is implemented using a monitor and keyboard.

When implemented as a node of a cluster, such as cluster 120 of FIG. 1B, the storage server further includes a cluster access adapter 230 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

Figure 3:
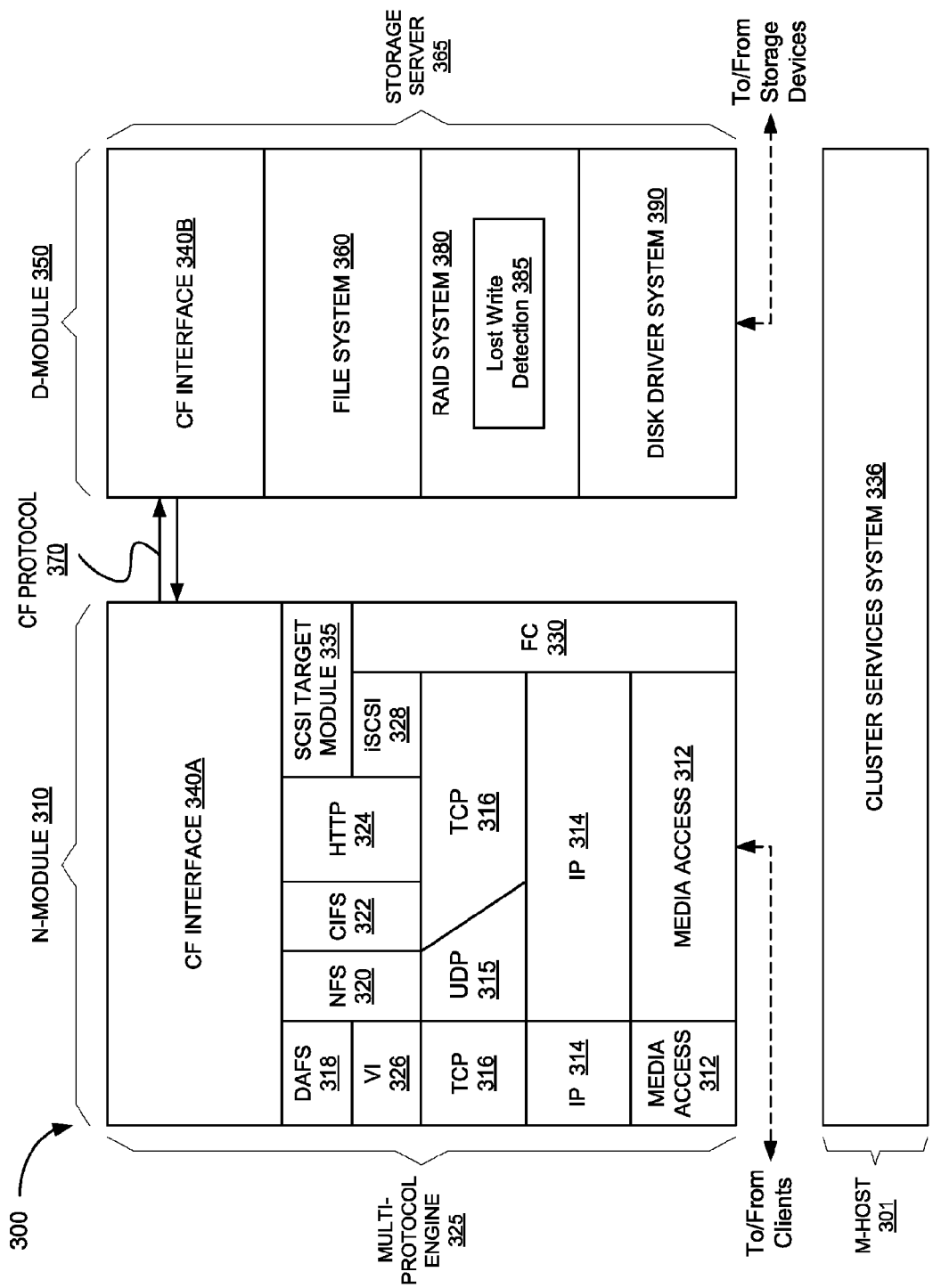
FIG. 3 is a block diagram illustrating the architecture of the operating system of the storage system in which lost write detection may be implemented according to an embodiment.

FIG. 3 is a block diagram of a storage operating system, such as storage operating system 214 of FIG. 2, which implements an embodiment of the lost write detection. The storage operating system 300 comprises a series of software layers executed by a processor, such as processor 202 of FIG. 2, and organized to form an integrated network protocol stack or, more generally, a multi-protocol engine 325 that provides data paths for clients to access information stored on the storage server using block and file access protocols.

Multi-protocol engine 325 includes a media access layer 312 of network drivers (e.g., gigabit Ethernet drivers) that interface with network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the storage server. In certain cases, a Fibre Channel over Ethernet (FCoE) layer (not shown) may also be operative in multi-protocol engine 325 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 365 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement.

File system 360 implements a virtualization system of the storage operating system through the interaction with one or more virtualization modules (illustrated as a SCSI target module 335). SCSI target module 335 is generally disposed between drivers 328, 330 and file system 360 to provide a translation layer between the block space and the file system space. In one embodiment, file system 360 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 360 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 312 or layer 330 processes the packet and, if appropriate, passes it on to a network protocol and file access layer for additional processing prior to forwarding to file system 360. There, file system 360 generates operations to load (retrieve) the requested data from the disks if it is not resident "in core", i.e., in memory 223. If the information is not in memory, file system 360 accesses the inode file to retrieve a logical vbn and passes a message structure including the logical vbn to the RAID system 380. There, the logical vbn is mapped to a disk identifier and device block number (dbn) and sent to an appropriate driver of disk driver system 390. The disk driver accesses the dbn from the specified disk and loads the requested data block(s) in memory for processing by the storage server. Upon completion of the request, the node (and operating system 300) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path is implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 220, 240 are configured to offload some or all of the packet processing and storage access operations, respectively, from processor 202, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 350 for accessing data stored on disk. In contrast, multi-protocol engine 325 may be embodied as N-module 310 to perform protocol termination with respect to a client issuing incoming access over the network, as well as to redirect the access requests to any other N-module in the cluster. A cluster services system 336 may further implement an M-host (e.g., M-host 301) to provide cluster services for generating information sharing operations to present a distributed file system image for the cluster. For instance, media access layer 312 may send and receive information packets between the various cluster services systems of the nodes to synchronize the replicated databases in each of the nodes.

In addition, a cluster fabric (CF) interface module 340 (CF interface modules 340A, 340B) may facilitate intra-cluster communication between N-module 310 and D-module 350 using a CF protocol 370. For instance, D-module 350 may expose a CF application programming interface (API) to which N-module 310 (or another D-module not shown) issues calls. To that end, CF interface module 340 can be organized as a CF encoder/decoder using local procedure calls (LPCs) and remote procedure calls (RPCs) to communicate a file system command to between D-modules residing on the same node and remote nodes, respectively.

As shown in FIG. 3, in one embodiment of the invention the RAID system 380 includes a lost write detection module 385, which performs operations associated with the technique being introduced herein, as described above and as further described below. Lost write detection module 385 may perform operations including generating a storage device signature, writing the storage device signature to a disk label or to a checksum area of a data block, and comparing the storage device signature in the checksum area to the storage device signature in the disk label.

In one embodiment, the storage device signature is stored in a 16 bit field of the disk label or other global field of a mass storage device and in the block checksum area or metadata field of a data block. Alternatively, those skilled in the art would understand that the storage device signature may be stored in some other location. The storage device signature may be derived from, for example, a timestamp with appropriate resolution or some other monotonously increasing number, or a random number. Initially, the storage device signature may be a random number generated by lost write detection module 385. A small random number does not guarantee that the storage device signature will be different from a number that is already stored on a disk label. So, for subsequent disks added to the RAID group, a simple increment may be done to the previous storage device signature to generate the new storage device signature value. This approach will help to minimize the chances of generating the same storage device signature accidentally when a disk is added to a RAID group. Several disks in a RAID group may have the same or different storage device signatures. Since the storage device signature is limited to each disk in a RAID group, multiple disks having same storage device signature in a RAID group need not be considered as a problem.

Figure 4:
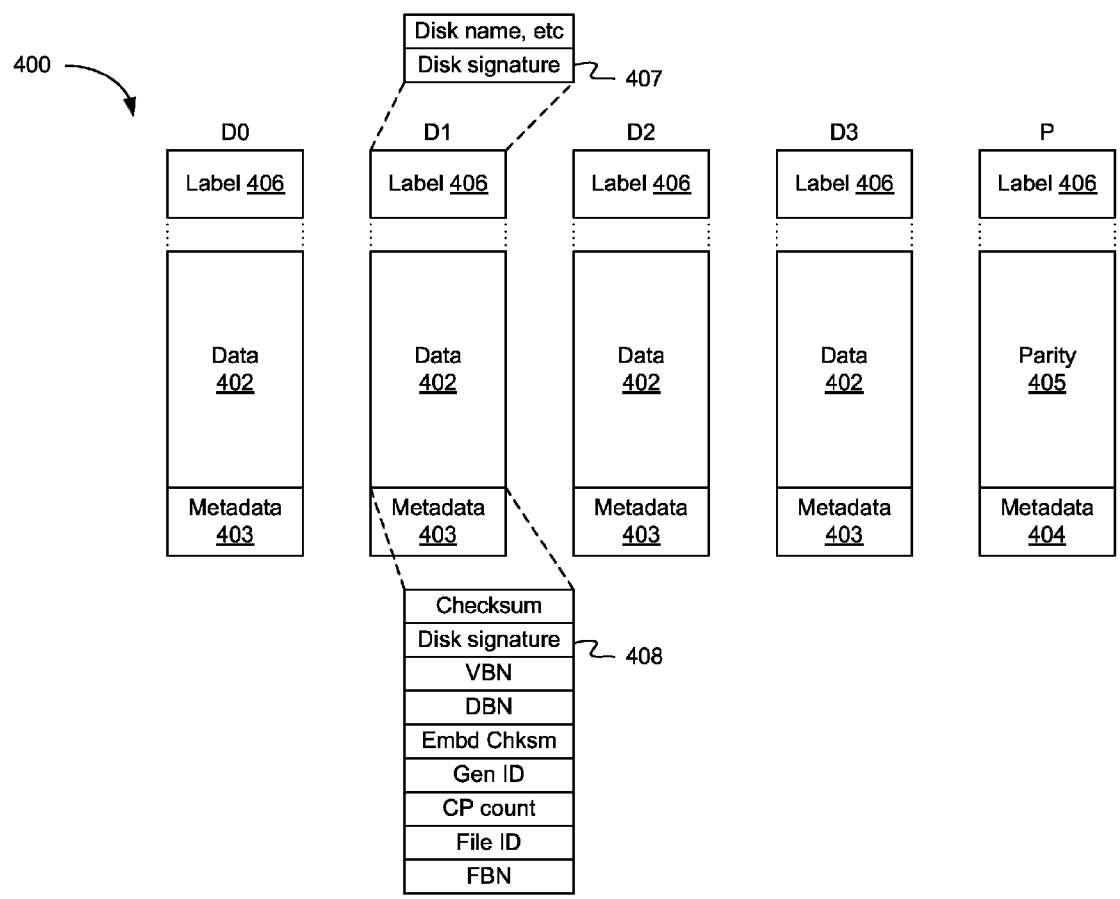
FIG. 4 is a block diagram illustrating a stripe of data blocks with storage device signatures stored in a parity group according to an embodiment.

FIG. 4 is a block diagram illustrating a stripe of data blocks 400 with storage device signatures stored in a parity group according to an embodiment. Each file stored by the storage server 210 is broken up by the file system 360 into data blocks, which are 4 Kbyte long in certain embodiments of the invention. The RAID layer 34 spreads data blocks across multiple disks in the storage subsystem 170 in one or more stripes, according to a RAID protocol. FIG. 4 illustrates a single stripe 400 in an illustrative parity group (e.g., RAID group) that contains four data disks (D0, D1, D2 and D3) and a parity disk (P). Parity disk P may include error detecting data used in a parity protection scheme. Note, however, that other configurations can be used in conjunction with the technique being introduced herein. In the illustrated embodiment, each stripe contains one data block 402 from each of the data disks and a parity block 405 from the parity disk.

Each disk in the parity group includes a label block 406 which stores identifying information for the disk. In one embodiment, the label 406 may include a number of fields such as disk name, disk type, disk state, disk size, and a storage device signature 407 (which may be alternatively referred to as a "disk signature"). When a data block 402 is stored on disk, a storage device signature 408 is assigned to the data block 402. The storage device signature 408 can be used during a subsequent read operation to determine if there is an error in the block. The storage device signature 408 may be included in a metadata field 403 that is collocated with the data block 402 and is written at the same time as data block 402. Although the format of disk label 406 metadata field 403 of only one block 402 is shown in detail in FIG. 4, all data blocks 402 have a metadata field 403 with essentially the same format as shown. In certain embodiments, the metadata field 403 is 64 bytes long. The metadata field 403 may also include a checksum, a volume block number (VBN) and disk block number (DBN) of the data block 402, an embedded checksum for the block-appended metadata itself, a generation ID including a random number and a generation count, a consistency point (CP) count, a file identifier (File ID) and a file block number (FBN). In addition, each block 405 in the parity disk P also has an associated metadata field 404 that includes some of the aforementioned types of information for that block as well as other information. For example, the metadata field 404 may include parity protection (e.g., logical combination such as XOR) for the CP count values in metadata fields 403 and a GenBmp storing generation counts from each of metadata fields 403.

The generation ID (Gen ID) is an identifier formed from a generation count (GenCnt) and a random number, which may be referred to as a supplemental ID. In one embodiment GenCnt is a 2 bit value which is incremented each time the associated data block 402 is written. A zero value may be reserved to signify that the GenCnt has not been initialized, and thus, in one embodiment, the value of GenCnt may revolve from one to three. In other embodiments, GntCnt may have some other size and/or another value of GenCnt may be reserved for a data block that has not been written. The GenCnt may be initially assigned to a data block 402 and subsequently updated by RAID system 380. For each stripe 400, the metadata field 404 associated with the parity block 405 (which is stored on the parity disk, P) includes a generation bitmap ("GenBmp"), which is a concatenation of all of the GenCnt values of the data blocks 402 in that stripe. Before writing to blocks, the new GenCnt for each data block 402 is computed from the current value stored in the parity GenBmp obtained by reading the parity disk, P. The GenCnt and GenBmp are used during reads to detect a stale data block, i.e., a data block representing a lost write. Specifically, when reading a data block 402, lost write detection module 385 compares the GenCnt of that data block against the corresponding bits in the GenBmp. If the bits match, the data block is considered to be correct. If the bits do not match, then the data block may be considered to contain stale data (e.g., a lost write). If a number of the bits in GenBmp do not match the corresponding GenCnt values, it is possible that the parity disk suffered a lost write. The supplemental ID in Gen ID may be a randomly generated number assigned to the metadata fields 403, 404 of each block 402, 405 when the whole stripe is written. The supplemental ID remains unchanged if a single block is written to, but may be replaced when the whole stripe is written again. In one embodiment, the supplemental ID in each of metadata fields 403 is a 32 bit value, however due to size constraints, only 8 bits of the supplemental ID may be stored in metadata field 404 on the parity disk. The lost write detection module 385 may compare the supplemental IDs stored in the metadata fields in order to detect a lost write. If one of the supplemental IDs does not match the others, it is possible that the corresponding data block suffered a lost write.

Another parameter used to confirm a lost write on a data block 402 is the CP count, also called "consistency point." A consistency point is a recurring event at which writes that have been buffered in memory of the storage server are committed to mass storage. For a given data block, the CP count indicates the particular consistency point at which the data block was last written. The CP count for each data block 402 and the CP count for the parity block 404 are parity protected. In one embodiment, the CP counts for each of the data blocks are logically combined (e.g., by an exclusive OR (XOR) operation) and the result is stored in metadata field 404 on the parity disk. This parity protection allows the CP count for of data blocks 402 or parity block 405 to be reconstructed. The reconstructed CP count may be compared to the actual CP count stored in metadata field 403 to determine if a lost write occurred on that disk. In one embodiment, if the reconstructed CP count is greater than the on-disk CP count, the reconstructed data is newer than the data present on the disk, and vice versa. Thus, if the reconstructed CP count is greater than the on-disk CP count, lost write detection module 385 determines that a lost write occurred on that particular disk. If the reconstructed CP count is less than the on-disk CP count, lost write detection module 385 determines that the lost write instead occurred on the parity disk P.

The above described mechanisms for detecting lost writes rely on available metadata information stored on the disk (i.e., Gen ID, CP count) to confirm the lost write. If the stored on-disk metadata used to confirm a lost write is not accurate or does not belong to the current aggregate or RAID group, a lost write may be inadvertently detected. For example, during a RAID group reconstruction, a non-zeroed disk may be added to the aggregate. The storage device signature 407 in the disk label 406 is updated, however, the storage device signature 408 in each metadata field 403 will not be updated until a successful write operation is performed on the data block 402. If a lost write occurs during the reconstruction, the data in metadata field 403 will be stale data from the newly added non-zeroed disk. The storage device signatures 407 and 408, stored in the disk label 406 and block metadata 403 respectively, verify that data and metadata seen on the disk block belongs to the current aggregate and can be used for further verification of suspected lost writes.

Figure 5:
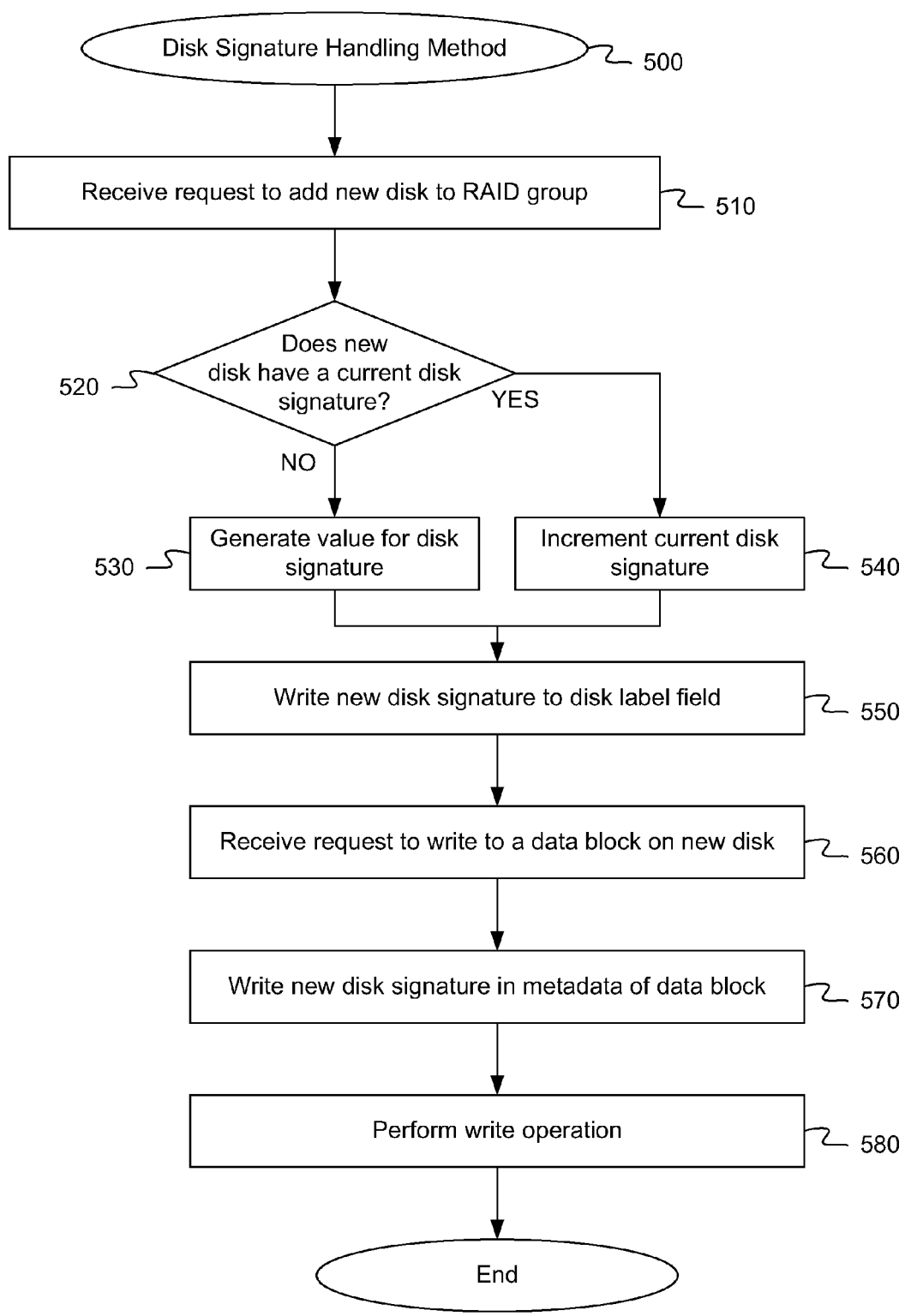
FIG. 5 is a flow chart illustrating a storage device signature handling method according to an embodiment.

FIG. 5 is a flow chart illustrating a storage device signature handling method according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 500 is performed by storage server 210 of FIG. 2.

Referring to FIG. 5, at step 510, method 500 receives request to add a new disk to a RAID group. A number of file system processes may issue the request to add the new disk and the request may be part of, for example, RAID group creation, disk addition, sick disk copy, RAID group reconstruction, or another process. At step 520, method 500 determines whether the new disk has a storage device signature, as opposed to having a zero or null value. In one embodiment, the storage device signature 407 may be a value stored in a globally accessible area of the disk, such as label 406. The storage device signature may be for example, a 16 bit value such as a timestamp or random number. Method 500 may determine whether a storage device signature is currently assigned to the new disk by examining a designated field in the disk label 406. If the designated field is storing a non-zero value, method 500 determines that the value constitutes a storage device signature. If the designated field has a zero or null value, the disk does not have a signature.

If at step 520 method 500 determines that the new disk does not have a storage device signature, at step 530, method 500 generates a value for the storage device signature. The value may be for example, a timestamp generated by a timer module, or a random number generated by a random number generator. If at step 520, method 500 determines that the new disk already has a storage device signature, at step 540, method 500 increments the storage device signature. Incrementing the storage device signature may include, for example, updating the timestamp with a current time value, or increasing the value of the number by one or another predetermined amount. At step 550, method 500 writes either the newly generated or recently increment storage device signature into the designated field in the disk label of the newly added disk.

At step 560, method 500 receives request to write to a data block on the newly added disk. The write request may be sent by a client device, such as client 102. In response to receiving the write request, at step 570 method 500 writes the new storage device signature 407 from the disk label 406 into the metadata field 403 of the data block 402 to which the write request was directed. The new storage device signature 408 may be written to a designated field in the metadata block 403. At step 580, method 500 writes the data into the requested data block 402. Thus, the storage device signature 408 in the metadata field 403 of data block 402 matches the storage device signature 407 in the disk label 406 of the disk. This indicates that the block has been successfully written to at least once after being added to the current RAID group or aggregate. As such, the matching storage device signatures indicated that the data stored in data block 402 is current and can be used to accurately determine whether a lost write has occurred.

Figure 6:
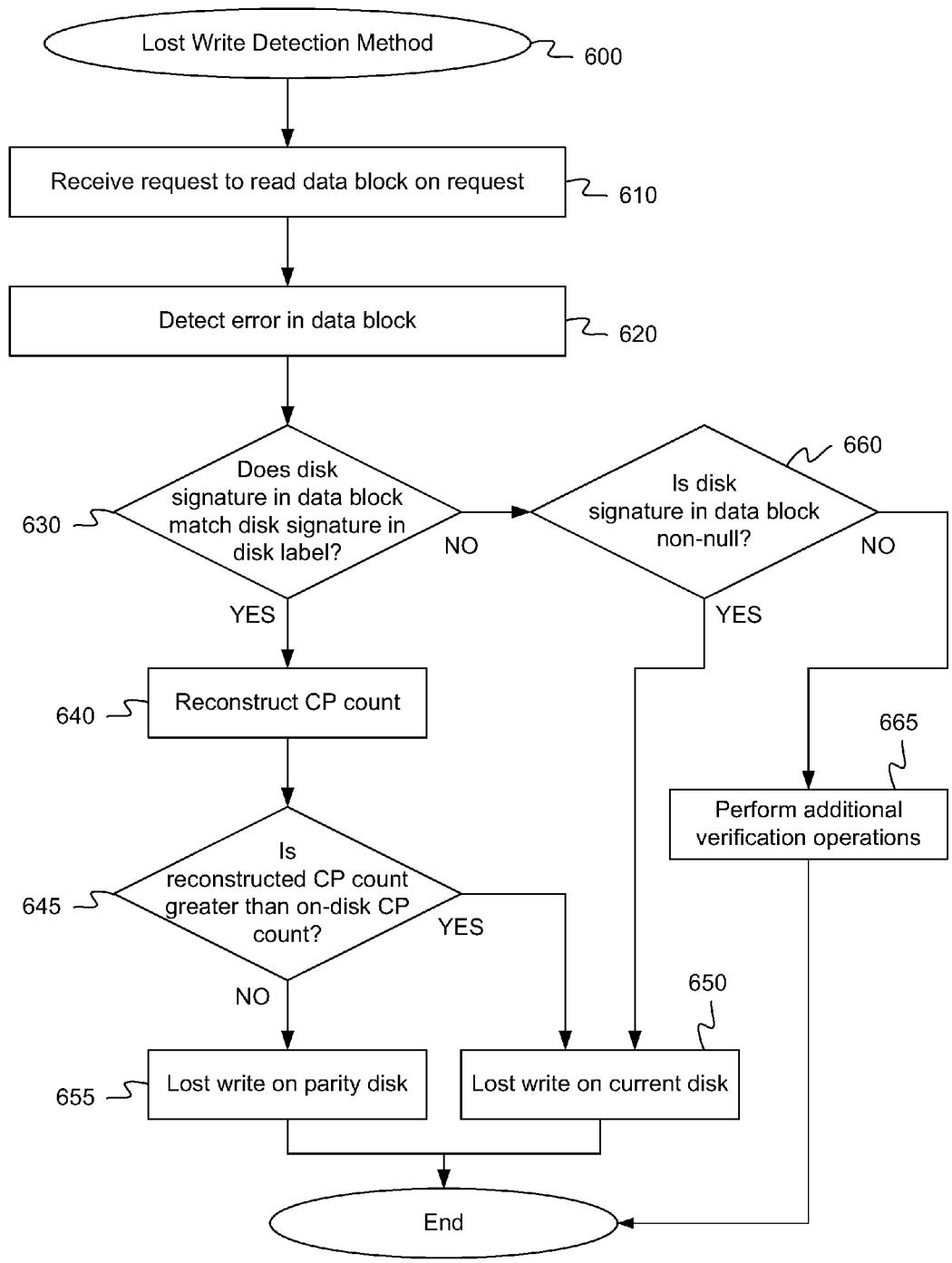
FIG. 6 is a flow chart illustrating a lost write detection method using storage device signatures according to an embodiment.

FIG. 6 is a flow chart illustrating a lost write detection method using storage device signatures according to an embodiment. In one embodiment, method 600 is performed by storage server 210 of FIG. 2. Referring to FIG. 6, at step 610, method 600 receives a data access request. The data access request may be received from RAID system 380. The data access request may be, for example, a read request needed to complete a write request received from file system 360, a read from remaining disks to satisfy a read request to a missing disk, a read during a reconstruction of a failed disk, a read request during a scrub operation, or other operation dictated by RAID system 380 rather than file system 360. The read request may specify a certain data block 402 where the requested data is stored. Upon receiving the read request, at step 620, method 600 performs one of a number of error detection or sanity check operations to detect an error in the data block 402. These operations may include, for example, comparing the generation count values for each data block to the GenBmp stored on the parity disk or comparing the random numbers stored in the metadata fields as part of the Gen ID, as discussed above with respect to FIG. 4. If a mismatch is detected in the operation, method 600 identifies that associated data block as having a suspected lost write and proceeds to step 630.

At step 630, method 600 compares the storage device signature 408 in block metadata 403 to the storage device signature 407 in disk label 406 for both a data disk and the parity disk. In one embodiment, the comparison is performed by comparison logic in lost write detection module 385. If the data block 402 has been previously written since the disk was added to the current RAID group, the proper storage device signature should have been written to metadata 403 in accordance with method 500, as illustrated in FIG. 5. If at step 630, method 600 determines that the storage device signatures on both the data disk and the parity disk match, at step 640, method 600 reconstructs the CP count for the data block 402 suspected of having a lost write. RAID system 380 may reconstruct the parity protected CP count according to any number of known reconstruction techniques. At step 645, method 600 compares the reconstructed CP count to the on-disk CP count stored in the metadata field 403. If the reconstructed CP count is greater than the on-disk CP count, at step 650, method 600 determines that a lost write has occurred on the current data block 402. If the reconstructed CP count is less than the on-disk CP count, at step 655, method 600 determines that a lost write has occurred on the parity block 405.

If at step 630, method 600 determines that the storage device signatures do not match, at step 660, method 600 determines if the storage device signature in metadata field 403 is a non-null value. Method 600 may determine whether a storage device signature is non-null by examining a designated field in the metadata 403. If the storage device signature 408 for the data block is non-null and does not match the storage device signature in the disk label, at step 650, method 600 determines that a lost write occurred on the current disk (e.g., a data disk 402, or parity disk 405). For example, if the storage device signatures on a data disk are non-null and do not match, but the storage device signatures on the parity disk are matching, method 600 determines that a lost write occurred on the data disk. Similarly, if the storage device signatures on the parity disk are non-null and do not match, but the storage device signatures on the data disks are matching, method 600 determines that a lost write occurred on the parity disk. Old disks added to the RAID group before the implementation of storage device signatures may have a null value, while still having current data. Thus, if the storage device signature for the data block is null on both the data disk and the parity disk, method 600 performs additional verification operations at step 665.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
receiving, by a storage server, a data access request specifying a data block in a stripe of a parity group that includes a plurality of data storage devices to store data and a parity storage device to store parity information, the stripe comprising a data block from each of the data storage devices and a parity block from the parity storage device;
detecting an error in the data block;
comparing a first storage device signature stored in a metadata field associated with the data block to a second storage device signature, wherein the first and second storage device signatures are used to verify that metadata associated with the data block belongs to the current parity group;
if the first storage device signature matches the second storage device signature, comparing a consistency point count stored in the metadata field to a reconstructed consistency point count; and
if the reconstructed consistency point count is greater than the consistency point count stored in the metadata field, identifying the error as a lost write error for the data block.

2. The method of claim 1, further comprising:
if the reconstructed consistency point count is less than the consistency point count stored in the metadata field, identifying the error as a lost write error for the parity block, wherein the parity block stores error detection data.

3. The method of claim 1, wherein detecting an error comprises:
comparing a generation count stored in the metadata field to a generation value stored in the parity storage device; and
if the generation count stored in the metadata field does not match the generation value, determining that an error has occurred.

4. The method of claim 1, wherein the second storage device signature is written to the metadata field upon a write operation being performed on the data block.

5. The method of claim 1, wherein the second storage device signature comprises a random number written to a global field of the data storage device containing the data block when the data storage device is added to the parity group.

6. The method of claim 1, further comprising:
if the first storage device signature does not match the second storage device signature, determining whether the second storage device signature is a non-null value; and
if the second storage device signature is a non-null value, determining that the error is a lost write error for the data block.

7. A system comprising:
an array of mass storage devices; and
a storage server coupled to the array of mass storage devices, the storage server comprising:
a lost write detection module configured to detect an error and identify the error as a lost write error, wherein identifying a lost write error comprises:
comparing a first storage device signature stored in a metadata field associated with a data block to a second storage device signature;
if the first storage device signature matches the second storage device signature, comparing a consistency point count stored in the metadata field to a reconstructed consistency point count; and
if the reconstructed consistency point count is greater than the consistency point count stored in the metadata field, identifying the error as a lost write error for the data block.

8. The system of claim 7, wherein the storage server is configured to receive a request specifying a data block in a stripe of a parity group that includes a plurality of data storage devices to store data and a parity storage device to store parity information, the stripe including a data block from each of the data storage devices and a parity block from the parity storage device, wherein the first and second storage device signatures are used to verify that metadata associated with the data block belongs to the current parity group.

9. The system of claim 8, wherein identifying a lost write error further comprises:
if the reconstructed consistency point count is less than the consistency point count stored in the metadata field, identifying the error as a lost write error for the parity block.

10. The system of claim 8, wherein detecting an error comprises:
comparing a generation count stored in the metadata field to a generation value stored in the parity storage device; and
if the generation count stored in the metadata field does not match the generation value, determining that an error has occurred.

11. The system of claim 7, wherein the second storage device signature is written to the metadata field upon a write operation being performed on the data block.

12. The system of claim 7, wherein the second storage device signature comprises a random number written to a global field of the data storage device containing the data block when the data storage device is added to the array of mass storage devices.

13. The system of claim 7, wherein identifying a lost write error further comprises:
if the first storage device signature does not match the second storage device signature, determining whether the second storage device signature is a non-null value; and if the second storage device signature is a non-null value, determining that the error is a lost write error for the data block.

14. A storage server comprising:
a processor unit; and
a memory, coupled to the processor unit, storing instructions which, when executed by the processor unit, cause the storage server to:
receive a data access request specifying a data block in a stripe of a parity group that includes a plurality of data storage devices to store data and a parity storage device to store parity information, the stripe including a data block from each of the data storage devices and a parity block from the parity storage device;
detect an error in the data block;
compare, by a lost write detection module, a first storage device signature stored in a metadata field associated with the data block to a second storage device signature, wherein the first and second storage device signatures are used to verify that metadata associated with the data block belongs to the current parity group;
if the first storage device signature does not match the second storage device signature, identify the error as a lost write error for the data block; and
if the first storage device signature matches the second storage device signature,
comparing a consistency point count stored in the metadata field to a reconstructed consistency point count, wherein the reconstructed CP count is reconstructed from data in each block in the stripe using parity techniques, and
if the reconstructed consistency point count is greater than the consistency point count stored in the metadata field, identifying the error as a lost write error for the data block.

15. The storage server of claim 14, wherein the instructions further cause the storage server to:
if the reconstructed consistency point count is not greater than the consistency point count stored in the metadata field, identifying the error as a lost write error for the parity block, wherein the parity block stores error detection data.

16. The storage server of claim 14, wherein detecting an error comprises:
comparing a generation count stored in the metadata field to a generation value stored in the parity storage device; and
if the generation count stored in the metadata field does not match the generation value, determining that an error has occurred.

17. The storage server of claim 14, wherein the second storage device signature is written to the metadata field upon a write operation being performed on the data block.

18. The storage server of claim 14, wherein the second storage device signature comprises a random number written to a global field of the data storage device containing the data block when the data storage device is added to the parity group.

19. The storage server of claim 14, wherein the instructions further cause the storage server to:
if the first storage device signature does not match the second storage device signature, determine whether the second storage device signature is a non-null value.

20. The storage server of claim 14, wherein the storage device signatures are used to accurately detect and identify a location of a lost write error, and wherein the instructions further cause the storage server to correct the error and provide a user with a complete and accurate set of data.

21. The storage server of claim 18, wherein the global field is accessible by all data blocks on the data storage device.

22. A method comprising:
receiving a data access request specifying a data block in a stripe of a parity group that includes a plurality of data storage devices to store data and a parity storage device to store parity information, the stripe including a data block from each of the data storage devices and a parity block from the parity storage device;
detecting an error in the data block;
comparing a first storage device signature stored in a metadata field associated with the data block to a second storage device signature, wherein the first and second storage device signatures are used to verify that metadata associated with the data block belongs to the current parity group;
if the first storage device signature does not match the second storage device signature, identify the error as a lost write error for the data block; and
if the first storage device signature matches the second storage device signature,
comparing, a consistency point count stored in the metadata field to a reconstructed consistency point count, and
if the reconstructed consistency point count is greater than the consistency point count stored in the metadata field, identifying the error as a lost write error for the data block.

23. The method of claim 22, wherein the second storage device signature is stored in a global field of the data storage device containing the data block.

* * * * *